United States Patent
Rustad et al.

(10) Patent No.: US 11,005,738 B1
(45) Date of Patent: May 11, 2021

(54) SYSTEM AND METHOD FOR END-TO-END RESPONSE-TIME ANALYSIS

(71) Applicant: Dell Software Inc., Aliso Viejo, CA (US)

(72) Inventors: Joseph Rustad, Toronto (CA); Naomi B. Bower, Toronto (CA); Hsing-Yu Chen, Mississauga (CA)

(73) Assignee: QUEST SOFTWARE INC., Aliso Viejo, CA (US)

( * ) Notice: Subject to any disclaimer, the term of this patent is extended or adjusted under 35 U.S.C. 154(b) by 830 days.

(21) Appl. No.: 14/249,147

(22) Filed: Apr. 9, 2014

(51) Int. Cl.
  *H04L 12/26* (2006.01)
  *G06F 11/34* (2006.01)
(52) U.S. Cl.
  CPC ........ *H04L 43/067* (2013.01); *G06F 11/3419* (2013.01); *G06F 11/3495* (2013.01)
(58) Field of Classification Search
  CPC ........... G06F 2201/865; G06F 11/3495; G06F 11/3419; G06F 11/3409; H04L 67/22
  See application file for complete search history.

(56) References Cited

U.S. PATENT DOCUMENTS

| | | | |
|---|---|---|---|
| 3,701,971 A | 10/1972 | Sanner et al. | |
| 3,839,707 A | 10/1974 | Woodward et al. | |
| 4,468,728 A | 8/1984 | Wang | |
| 4,683,532 A | 7/1987 | Yount et al. | |
| 4,937,740 A | 6/1990 | Agarwal et al. | |
| 5,103,394 A | 4/1992 | Blasciak | |
| 5,321,838 A | 6/1994 | Hensley et al. | |
| 5,375,199 A | 12/1994 | Harrow et al. | |
| 5,432,932 A | 7/1995 | Chen et al. | |
| 5,450,586 A | 9/1995 | Kuzara et al. | |
| 5,493,658 A | 2/1996 | Chiang et al. | |

(Continued)

FOREIGN PATENT DOCUMENTS

WO  WO-2013162596 A1  10/2013

OTHER PUBLICATIONS

U.S. Appl. No. 14/619,897, Diep et al.
(Continued)

*Primary Examiner* — Barbara B Anyan
(74) *Attorney, Agent, or Firm* — Shackelford, Bowen, McKinley & Norton, LLP

(57) ABSTRACT

In one embodiment, a method includes selecting a group of transactions having a common end-to-end transaction path comprising a plurality of transaction-path nodes. Each transaction of the group is associated with either an acceptable category or an unacceptable category based, at least in part, on an end-to-end response time for the transaction. The method further includes separately determining, for each transaction-path node, an execution-time pair. The execution-time pair includes first aggregate information indicative of execution time by the transaction-path node for transactions associated with the acceptable category. The execution-time pair also includes second aggregate information indicative of execution time by the transaction-path node for transactions associated with the unacceptable category. Additionally, the method includes generating a visualization of the end-to-end transaction path. The visualization depicts each determined execution-time pair in relation to a corresponding transaction-path node.

16 Claims, 6 Drawing Sheets

(56) References Cited

U.S. PATENT DOCUMENTS

| | | |
|---|---|---|
| 5,506,955 A | 4/1996 | Chen et al. |
| 5,517,629 A | 5/1996 | Boland |
| 5,528,753 A | 6/1996 | Fortin |
| 5,539,907 A | 7/1996 | Srivastava et al. |
| 5,572,640 A | 11/1996 | Schettler |
| 5,600,789 A | 2/1997 | Parker et al. |
| 5,623,598 A | 4/1997 | Voigt et al. |
| 5,649,187 A | 7/1997 | Hornbuckle |
| 5,671,351 A | 9/1997 | Wild et al. |
| 5,673,386 A | 9/1997 | Batra |
| 5,684,945 A | 11/1997 | Chen et al. |
| 5,701,137 A | 12/1997 | Kiernan et al. |
| 5,708,775 A | 1/1998 | Nakamura |
| 5,715,388 A | 2/1998 | Tsuchihashi |
| 5,715,415 A | 2/1998 | Dazey et al. |
| 5,720,018 A | 2/1998 | Muller et al. |
| 5,740,357 A | 4/1998 | Gardiner et al. |
| 5,748,881 A | 5/1998 | Lewis et al. |
| 5,752,062 A | 5/1998 | Gover et al. |
| 5,768,501 A | 6/1998 | Lewis |
| 5,872,909 A | 2/1999 | Wilner et al. |
| 5,881,306 A | 3/1999 | Levine et al. |
| 5,903,453 A | 5/1999 | Stoddard, II |
| 5,903,898 A | 5/1999 | Cohen et al. |
| 5,911,048 A | 6/1999 | Graf |
| 5,960,425 A | 9/1999 | Buneman et al. |
| 5,978,594 A | 11/1999 | Bonnell et al. |
| 5,983,366 A | 11/1999 | King |
| 5,999,734 A | 12/1999 | Willis et al. |
| 6,018,567 A | 1/2000 | Dulman |
| 6,029,170 A | 2/2000 | Garger et al. |
| 6,035,412 A | 3/2000 | Tamer et al. |
| 6,128,016 A | 10/2000 | Coelho et al. |
| 6,148,335 A | 11/2000 | Haggard et al. |
| 6,173,322 B1 | 1/2001 | Hu |
| 6,195,092 B1 | 2/2001 | Dhond et al. |
| 6,199,199 B1 | 3/2001 | Johnston et al. |
| 6,223,171 B1 | 4/2001 | Chaudhuri et al. |
| 6,243,105 B1 | 6/2001 | Hoyer et al. |
| 6,330,008 B1 | 12/2001 | Razdow et al. |
| 6,351,754 B1 | 2/2002 | Bridge, Jr. et al. |
| 6,381,628 B1 | 4/2002 | Hunt |
| 6,473,791 B1 | 10/2002 | Al-Ghosein et al. |
| 6,538,669 B1 | 3/2003 | Lagueux, Jr. et al. |
| 6,543,006 B1 | 4/2003 | Zundel et al. |
| 6,594,655 B2 | 7/2003 | Tal et al. |
| 6,622,221 B1 | 9/2003 | Zahavi |
| RE38,270 E | 10/2003 | Nakajima |
| 6,633,640 B1 | 10/2003 | Cohen et al. |
| 6,654,830 B1 | 11/2003 | Taylor et al. |
| 6,751,555 B2 | 6/2004 | Poedjono |
| 6,771,646 B1 | 8/2004 | Sarkissian et al. |
| 6,833,787 B1 | 12/2004 | Levi |
| 6,847,970 B2 | 1/2005 | Keller et al. |
| 6,901,582 B1 | 5/2005 | Harrison |
| 6,993,454 B1 | 1/2006 | Murstein et al. |
| 7,010,588 B2 | 3/2006 | Martin et al. |
| 7,103,843 B2 | 9/2006 | Hand et al. |
| 7,127,324 B2 | 10/2006 | Batori et al. |
| 7,257,635 B2 | 8/2007 | Chellis et al. |
| 7,274,375 B1 | 9/2007 | David |
| 7,363,211 B1 | 4/2008 | Naganathan et al. |
| 7,370,105 B2 | 5/2008 | Lebourg et al. |
| 7,389,345 B1 | 6/2008 | Adams |
| 7,436,822 B2 | 10/2008 | Lee et al. |
| 7,480,647 B1 | 1/2009 | Murstein et al. |
| 7,480,866 B2 | 1/2009 | Germain et al. |
| 7,483,978 B2 | 1/2009 | Esfahany et al. |
| 7,512,888 B2 | 3/2009 | Sugino et al. |
| 7,523,128 B1 | 4/2009 | Miller et al. |
| 7,532,642 B1 | 5/2009 | Peacock |
| 7,557,803 B2 | 7/2009 | Furukawa et al. |
| 7,558,790 B1 | 7/2009 | Miller et al. |
| 7,565,610 B2 | 7/2009 | Li et al. |
| 7,587,492 B2 | 9/2009 | Dyck et al. |
| 7,620,984 B2 | 11/2009 | Kallahalla et al. |
| 7,644,397 B2 | 1/2010 | Warren et al. |
| 7,685,251 B2 | 3/2010 | Houlihan et al. |
| 7,698,683 B1 | 4/2010 | Miller et al. |
| 7,784,027 B2 | 8/2010 | Harrison |
| 7,792,941 B2 | 9/2010 | Fried et al. |
| 7,822,837 B1 | 10/2010 | Urban et al. |
| 7,882,216 B2 | 2/2011 | Houlihan et al. |
| 7,917,617 B1 | 3/2011 | Ponnapur et al. |
| 7,950,026 B1 | 5/2011 | Urbach |
| 7,962,590 B1 | 6/2011 | Or et al. |
| 7,979,245 B1 | 7/2011 | Bourlatchkov et al. |
| 8,051,162 B2 | 11/2011 | Arlitt et al. |
| 8,051,330 B2 | 11/2011 | Cinato et al. |
| 8,051,382 B1 | 11/2011 | Kingdom et al. |
| 8,103,638 B2 | 1/2012 | Voznika et al. |
| 8,103,826 B2 | 1/2012 | Kobayashi |
| 8,112,366 B2 | 2/2012 | Hollingsworth et al. |
| 8,155,996 B1 | 4/2012 | Cassone et al. |
| 8,161,058 B2 | 4/2012 | Agarwal et al. |
| 8,175,862 B1 | 5/2012 | Bourlatchkov et al. |
| 8,175,863 B1 | 5/2012 | Ostermeyer et al. |
| 8,181,154 B2 | 5/2012 | Harrison |
| 8,185,598 B1 | 5/2012 | Golovin et al. |
| 8,203,972 B2 | 6/2012 | Sauermann |
| 8,217,945 B1 | 7/2012 | Moscovici |
| 8,239,526 B2 | 8/2012 | Simpson et al. |
| 8,255,516 B1 | 8/2012 | Zhang et al. |
| 8,307,337 B2 | 11/2012 | Chamieh et al. |
| 8,347,273 B2 | 1/2013 | Nageshappa et al. |
| 8,364,460 B2 | 1/2013 | Ostermeyer et al. |
| 8,423,646 B2 | 4/2013 | Jamjoom et al. |
| 8,438,609 B2 | 5/2013 | Cohen et al. |
| 8,490,055 B2 | 7/2013 | Basak |
| 8,555,244 B2 | 10/2013 | Harrison |
| 8,635,498 B2 | 1/2014 | Kahana et al. |
| 8,712,950 B2 | 4/2014 | Smith et al. |
| RE44,964 E | 6/2014 | Kymal et al. |
| 8,819,673 B1 | 8/2014 | Wilkinson et al. |
| 8,880,678 B1 | 11/2014 | Colton et al. |
| 8,892,415 B2 | 11/2014 | Bourlatchkov et al. |
| 8,902,248 B1 | 12/2014 | Bidarkar et al. |
| 8,930,395 B2 | 1/2015 | Sharma et al. |
| 8,966,036 B1 | 2/2015 | Asgekar et al. |
| 8,966,039 B1 | 2/2015 | Fultz et al. |
| 9,075,911 B2 | 7/2015 | Mohan et al. |
| 9,288,147 B2 | 3/2016 | Kern et al. |
| 9,497,243 B1 | 11/2016 | Binns et al. |
| 9,557,879 B1 | 1/2017 | Wang et al. |
| 9,569,179 B1 | 2/2017 | Kachmar et al. |
| 9,811,365 B2 | 11/2017 | Borthakur |
| 9,860,139 B2 | 1/2018 | Spracklen et al. |
| 9,882,969 B2 | 1/2018 | Reddy et al. |
| 9,998,393 B2 | 6/2018 | Hanis et al. |
| 10,075,459 B1 | 9/2018 | Suryanarayanan et al. |
| 2001/0018710 A1 | 8/2001 | Clarke et al. |
| 2002/0138659 A1 | 9/2002 | Trabaris et al. |
| 2002/0175941 A1 | 11/2002 | Hand et al. |
| 2003/0009551 A1 | 1/2003 | Benfield et al. |
| 2003/0028630 A1 | 2/2003 | Bischof et al. |
| 2003/0084155 A1 | 5/2003 | Graupner et al. |
| 2003/0097438 A1 | 5/2003 | Bearden et al. |
| 2003/0101262 A1 | 5/2003 | Godwin |
| 2003/0126256 A1 | 7/2003 | Cruickshank et al. |
| 2003/0149753 A1 | 8/2003 | Lamb |
| 2003/0204588 A1 | 10/2003 | Peebles et al. |
| 2003/0225563 A1 | 12/2003 | Gonos |
| 2004/0006763 A1 | 1/2004 | Van De Vanter et al. |
| 2004/0012637 A1 | 1/2004 | Alford et al. |
| 2004/0030592 A1 | 2/2004 | Buck et al. |
| 2004/0039728 A1 | 2/2004 | Fenlon et al. |
| 2004/0046785 A1 | 3/2004 | Keller |
| 2004/0059812 A1 | 3/2004 | Assa |
| 2004/0064293 A1 | 4/2004 | Hamilton et al. |
| 2004/0068560 A1* | 4/2004 | Oulu ............... G06F 11/3495 709/224 |
| 2004/0102925 A1 | 5/2004 | Giffords |
| 2004/0147265 A1 | 7/2004 | Kelley et al. |
| 2004/0225952 A1 | 11/2004 | Brown et al. |

(56) References Cited

U.S. PATENT DOCUMENTS

| | | |
|---|---|---|
| 2005/0021743 A1 | 1/2005 | Fleig et al. |
| 2005/0021748 A1 | 1/2005 | Garcea et al. |
| 2005/0044528 A1 | 2/2005 | Olsen |
| 2005/0060300 A1 | 3/2005 | Stolte et al. |
| 2005/0111352 A1 | 5/2005 | Ho et al. |
| 2005/0187750 A1* | 8/2005 | Satoh ................. G06F 17/5045 703/14 |
| 2005/0198649 A1 | 9/2005 | Zakonov |
| 2005/0232227 A1 | 10/2005 | Jorgenson et al. |
| 2006/0002478 A1 | 1/2006 | Seo |
| 2006/0101340 A1 | 5/2006 | Sridhar et al. |
| 2006/0168199 A1 | 7/2006 | Chagoly et al. |
| 2006/0171334 A1 | 8/2006 | Hirata et al. |
| 2006/0173875 A1 | 8/2006 | Stefaniak |
| 2006/0235928 A1 | 10/2006 | Cacenco et al. |
| 2007/0008884 A1* | 1/2007 | Tang ...................... H04L 29/06 370/230 |
| 2007/0028239 A1 | 2/2007 | Dyck et al. |
| 2007/0043860 A1 | 2/2007 | Pabari |
| 2007/0087756 A1 | 4/2007 | Hoffberg |
| 2007/0226341 A1 | 9/2007 | Mateo |
| 2007/0250525 A1 | 10/2007 | Sanghvi et al. |
| 2007/0255805 A1 | 11/2007 | Beams et al. |
| 2007/0255814 A1 | 11/2007 | Green et al. |
| 2008/0016115 A1 | 1/2008 | Bahl et al. |
| 2008/0077366 A1 | 3/2008 | Neuse et al. |
| 2008/0155537 A1 | 6/2008 | Dinda et al. |
| 2008/0162107 A1 | 7/2008 | Aniszczyk et al. |
| 2008/0162387 A1 | 7/2008 | Singh et al. |
| 2008/0208888 A1 | 8/2008 | Mitchell |
| 2008/0222633 A1 | 9/2008 | Kami |
| 2008/0263073 A1* | 10/2008 | Ohba ................... G06F 11/3419 |
| 2008/0306711 A1* | 12/2008 | Bansal ................ G06F 11/3419 702/182 |
| 2008/0320269 A1 | 12/2008 | Houlihan et al. |
| 2009/0013281 A1 | 1/2009 | Helfman et al. |
| 2009/0083276 A1* | 3/2009 | Barsness ........... G06F 17/30563 |
| 2009/0119301 A1 | 5/2009 | Cherkasova et al. |
| 2009/0147011 A1 | 6/2009 | Buck et al. |
| 2009/0150538 A1 | 6/2009 | Tripathi et al. |
| 2009/0164250 A1 | 6/2009 | Hamilton et al. |
| 2009/0172666 A1 | 7/2009 | Yahalom et al. |
| 2009/0177567 A1 | 7/2009 | McKerlich et al. |
| 2009/0199177 A1 | 8/2009 | Edwards et al. |
| 2009/0204718 A1 | 8/2009 | Lawton et al. |
| 2009/0210527 A1 | 8/2009 | Kawato |
| 2009/0222558 A1 | 9/2009 | Xu et al. |
| 2009/0241108 A1 | 9/2009 | Edwards et al. |
| 2009/0271646 A1 | 10/2009 | Talwar et al. |
| 2009/0300605 A1 | 12/2009 | Edwards et al. |
| 2010/0015926 A1 | 1/2010 | Luff |
| 2010/0114554 A1 | 5/2010 | Misra |
| 2010/0125665 A1 | 5/2010 | Simpson et al. |
| 2010/0138744 A1 | 6/2010 | Kamay et al. |
| 2010/0153862 A1 | 6/2010 | Schreiber |
| 2010/0153916 A1 | 6/2010 | Bhatkhande et al. |
| 2010/0190509 A1 | 7/2010 | Davis |
| 2010/0223609 A1 | 9/2010 | DeHaan et al. |
| 2010/0229096 A1 | 9/2010 | Maiocco et al. |
| 2010/0241690 A1 | 9/2010 | Kurapati et al. |
| 2010/0250892 A1 | 9/2010 | Logan et al. |
| 2010/0305721 A1 | 12/2010 | Kostadinov et al. |
| 2010/0315958 A1 | 12/2010 | Luo et al. |
| 2010/0317420 A1 | 12/2010 | Hoffberg |
| 2010/0325273 A1 | 12/2010 | Kudo |
| 2011/0047496 A1 | 2/2011 | Harrison |
| 2011/0066780 A1 | 3/2011 | Bruce et al. |
| 2011/0119748 A1 | 5/2011 | Edwards et al. |
| 2011/0125800 A1 | 5/2011 | Seager et al. |
| 2011/0145380 A1 | 6/2011 | Glikson et al. |
| 2011/0153724 A1 | 6/2011 | Raja et al. |
| 2011/0161851 A1 | 6/2011 | Barber et al. |
| 2011/0187711 A1 | 8/2011 | Giovinazzi et al. |
| 2011/0197205 A1 | 8/2011 | Wagner et al. |
| 2011/0208827 A1 | 8/2011 | Pitkow et al. |
| 2011/0209146 A1 | 8/2011 | Box et al. |
| 2011/0254704 A1 | 10/2011 | Fournier et al. |
| 2011/0270566 A1* | 11/2011 | Sawada ............... H01J 49/0031 702/108 |
| 2011/0298804 A1 | 12/2011 | Hao et al. |
| 2011/0302577 A1 | 12/2011 | Reuther et al. |
| 2012/0005148 A1 | 1/2012 | Horvitz et al. |
| 2012/0011254 A1 | 1/2012 | Jamjoom et al. |
| 2012/0023429 A1 | 1/2012 | Medhi |
| 2012/0029929 A1 | 2/2012 | Schaude et al. |
| 2012/0030346 A1 | 2/2012 | Fukuda et al. |
| 2012/0079497 A1 | 3/2012 | Gangemi et al. |
| 2012/0137367 A1 | 5/2012 | Dupont et al. |
| 2012/0166623 A1 | 6/2012 | Suit |
| 2012/0198073 A1 | 8/2012 | Srikanth et al. |
| 2012/0221314 A1 | 8/2012 | Bourlatchkov et al. |
| 2012/0222002 A1 | 8/2012 | Harrison |
| 2012/0254900 A1 | 10/2012 | Kumar et al. |
| 2012/0271821 A1 | 10/2012 | Qin et al. |
| 2012/0271937 A1 | 10/2012 | Cotten et al. |
| 2012/0284713 A1 | 11/2012 | Ostermeyer et al. |
| 2013/0066823 A1 | 3/2013 | Sweeney et al. |
| 2013/0080641 A1 | 3/2013 | Lui et al. |
| 2013/0097580 A1 | 4/2013 | Meijer et al. |
| 2013/0159115 A1 | 6/2013 | Adams |
| 2013/0159999 A1 | 6/2013 | Chiueh et al. |
| 2013/0174127 A1 | 7/2013 | Chen et al. |
| 2013/0185433 A1 | 7/2013 | Zhu et al. |
| 2013/0211905 A1 | 8/2013 | Qin et al. |
| 2013/0212285 A1 | 8/2013 | Hoffmann et al. |
| 2013/0218547 A1 | 8/2013 | Ostermeyer et al. |
| 2013/0253718 A1 | 9/2013 | Meagher et al. |
| 2013/0262915 A1 | 10/2013 | Frank et al. |
| 2013/0331963 A1 | 12/2013 | Ahangar et al. |
| 2014/0006580 A1 | 1/2014 | Raghu |
| 2014/0013315 A1 | 1/2014 | Genevski et al. |
| 2014/0052712 A1 | 2/2014 | Savage et al. |
| 2014/0079297 A1 | 3/2014 | Tadayon et al. |
| 2014/0082612 A1 | 3/2014 | Breitgand et al. |
| 2014/0089901 A1 | 3/2014 | Hadar |
| 2014/0092722 A1 | 4/2014 | Jain et al. |
| 2014/0108647 A1 | 4/2014 | Bleess et al. |
| 2014/0115164 A1 | 4/2014 | Kalyanaraman et al. |
| 2014/0165054 A1 | 6/2014 | Wang et al. |
| 2014/0165063 A1 | 6/2014 | Shiva et al. |
| 2014/0229934 A1 | 8/2014 | Larkin et al. |
| 2014/0258872 A1 | 9/2014 | Spracklen et al. |
| 2014/0269691 A1 | 9/2014 | Xue et al. |
| 2014/0279723 A1 | 9/2014 | McGavran et al. |
| 2014/0279838 A1 | 9/2014 | Tsirogiannis et al. |
| 2014/0304407 A1 | 10/2014 | Moon |
| 2014/0310813 A1 | 10/2014 | Murthy |
| 2014/0317261 A1 | 10/2014 | Shatzkamer et al. |
| 2014/0317293 A1 | 10/2014 | Shatzkamer |
| 2014/0337500 A1 | 11/2014 | Lee |
| 2014/0350888 A1 | 11/2014 | Gesmann |
| 2014/0365196 A1 | 12/2014 | Melander et al. |
| 2014/0372230 A1 | 12/2014 | Ray et al. |
| 2015/0032436 A1 | 1/2015 | van de Kamp |
| 2015/0032437 A1 | 1/2015 | Kumar et al. |
| 2015/0046212 A1* | 2/2015 | Mos ................... G06Q 10/0633 705/7.27 |
| 2015/0052250 A1 | 2/2015 | Doganata et al. |
| 2015/0089483 A1 | 3/2015 | Guthridge |
| 2015/0127415 A1 | 5/2015 | Showalter et al. |
| 2015/0127815 A1 | 5/2015 | Billore et al. |
| 2015/0134589 A1* | 5/2015 | Marrelli ............ G06F 17/30563 707/602 |
| 2015/0142457 A1 | 5/2015 | Marshall |
| 2015/0199207 A1 | 7/2015 | Lin et al. |
| 2015/0358391 A1 | 12/2015 | Moon et al. |
| 2016/0011894 A1 | 1/2016 | Reddy et al. |
| 2016/0035114 A1 | 2/2016 | Hesse et al. |
| 2016/0042296 A1 | 2/2016 | Shan et al. |
| 2016/0048408 A1 | 2/2016 | Madhu et al. |
| 2016/0094401 A1 | 3/2016 | Anwar et al. |
| 2016/0147522 A1 | 5/2016 | Dimitrakos et al. |
| 2016/0191345 A1 | 6/2016 | Despotovic et al. |
| 2016/0254965 A1 | 9/2016 | Maes |

(56) References Cited

U.S. PATENT DOCUMENTS

2016/0274948 A1 9/2016 Kelly et al.
2016/0291942 A1 10/2016 Hutchison
2016/0359872 A1 12/2016 Yadav et al.

OTHER PUBLICATIONS

Layered Technologies, Inc., "Optimized Application Performance and User Experience: Application Performance Management Service," 2013, 4 pages.
Levey, Tom, "Monitoring the Real End User Experience," www.appdynamics.com, Jul. 25, 2013, 7 pages.
U.S. Appl. No. 13/745,677, Ostermeyer.
U.S. Appl. No. 13/658,709, Wang et al.
U.S. Appl. No. 13/658,724, Wang et al.
U.S. Appl. No. 14/725,778, Chen et al.
U.S. Appl. No. 14/607,776, Qin et al.
U.S. Appl. No. 14/607,907, Qin et al.
U.S. Appl. No. 14/858,341, Qin et al.
Template Software, Workflow Template Process Template, "Developing a WFT Workflow System", 1997, whole manual.
Partridge C. et al. Fire State Message Protocol Specification, BBN Technologies, Jul. 12, 2000, (pp. 1-19).
Newrelicblog, "Platform as a Service Meets SaaS Application Performance Management"; http://blog.newrelic.com/2011/01/13/platform-as-a-service-meets-saas-application-performance-management/; Jan. 13, 2011; 3 pages.
Quest Software, Inc.; "Instance Monitor"; Brochure, Quest Software, Inc.; 1999; 2 pages.
Boucher, Karen et al.; "Essential Guide to Object Monitors"; Mar. 1999; 263 pages (whole book).
Dewan, Prasun et al.; "A High-Level and Flexible Framework for Implementing Multiuser User Interfaces"; 1992; pp. 345-380.
Distributed Management Task Force, Inc. (DMTF); "Common Information Model (CIM) Infrastructure Specification"; Version 2.3 Final; Oct. 4, 2005; 102 pages.
Harrison, Guy; "Oracle SQL High-Performance Tuning"; ("Building a High-Performance Oracle Database Server" and "Tuning the Database Server"); Prentice-Hall, NJ; 1997; pp. 363-364 and 399-400.
Hitachi, LTD et al.; "Hitachi TPBroker User's Guide: Release 3.1"; Sep. 28, 1998; 311 pages (entire manual).
Laessig, Dirk; "Score Big with JSR 77, the J2EE Management Specification"; Javaworld; Jun. 14, 2002; 8 pages.
Muller, Nathan J.; "Focus on HP OpenView: A Guide to Hewlett-Packard's Network and Systems Management Platform"; CBM Books; 1995; 304 pages (entire book).
Savant Corporation; "Products"; http://www.savant-corp.com/prods.html, downloaded on Nov. 16, 1999; 1 page.
Savant Corporation; "Products"; http://www.savant-corp.com/prods.html, downloaded on Feb. 15, 2000; 1 page.
Savant Corporation; "Q Application Diagnostics"; http://www.savant-corp.com/qappd.html, downloaded on Nov. 16, 1999; 1 page.
Savant Corporation; "Q Hot SQL"; http://www.savant-corp.com/qhsql.html, downloaded on Nov. 16, 1999; 1 page.
Savant Corporation; "Q Instance Overview"; http://www.savant-corp.com/qiov.html, downloaded on Nov. 16, 1999; 1 page.
Savant Corporation; "Q Job Queue Manager"; http://www.savant-corp.com/qjobq.html, downloaded on Nov. 16, 1999; 1 page.
Savant Corporation; "Q Lock Manager"; http://www.savant-corp.com/qlock.html, downloaded on Nov. 16, 1999; 1 page.
Savant Corporation; "Q Replay Viewer"; http://www.savant-corp.com/qreplay.html, downloaded on Nov. 16, 1999; 1 page.
Singh, Inderjeet et al.; "Designing Web Services with J2EE 1.4 Platform JAX-RPC, SOAP, and XML Technologies"; Chapter 6 (pp. 247-289); May 2004; 46 pages.
Tang, Steven H. et al.; "Blending Structured Graphics and Layout"; ACM; Nov. 1994; pp. 167-174.
Wikimedia Foundation, Inc.; "Network Functions Virtualization"; http://en.wikipedia.org/wiki/Network_Functions_Virtualization; last modified Mar. 17, 2015; 6 pages.
NEO4J; "Network Dependency Graph"; http://www.neo4j.org/graphgist?github-neo4J . . . ; Jun. 18, 2014; 9 pages.
BMC Software, Inc.; "BMC Atrium Discovery and Dependency Mapping"; http://documents.bmc.com/products/documents/18/60/451860/451860.pdf ; 2014; 2 pages.
Grisby, Duncan; "The Power behind BMC Atrium Discovery and Dependency Mapping"; http://documents.bmc.com/products/documents/18/97/451897/451897.pdf; 2014; 5 pages.
Hewlett-Packard Development Company, L.P.; "Data Sheet: HP Universal Discovery Software"; http://h20195.www2.hp.com/V2/GetPDF.aspx/4AA4-1812ENW.pdf; Sep. 2014; 8 pages.
Quest Software, Inc.; "Foglight 5.6.4: Managing Dependency Mapping User Guide"; 2012; 62 pages.
Quest Software, Inc.; "Foglight 5.6.2: Managing the Dependency Mapping User Guide"; 2011; 55 pages.
Quest Software, Inc.; "Foglight APM: An Adaptive Architecture for All Environments"; 2011; 25 pages.
VFoglight Alarms: Overview—Demo 6; 2009; 31 pages.
Quest Software, Inc.; "Foglight 5.5.8: Managing Dependency Mapping User Guide"; 2011; 53 pages.
Cappelli, Will; "APM Needs Three-Layered Application Materials"; Gartner Research; Feb. 26, 2010; 5 pages.
Microsoft; "What is System Center Advisor?"; http://onlinehelp.microsoft.com/en-us/advisor/ff962512(printer).aspx; accessed on Apr. 5, 2011; 2 pages.
Microsoft; "Microsoft System Center Advisor"; https://www.systemcenteradvisor.com/; accessed on Apr. 4, 2011; 1 page.
Microsoft; "Windows Management Instrumentation (WMI): Frequently Asked Questions: Troubleshooting and Tips"; http://technet.microsoft.com/en-us/library/ee692772(d=printer).aspx; Microsoft TechNet; Jul. 28, 2004; 20 pages.
Maston, Michael; "Managing Windows with WMI"; http://technet.microsoft.com/en-us/library/bb742445(d=printer).aspx; Nov. 1, 1999; 11 pages.
Aternity, Inc., "Aternity Virtual Desktop Monitoring: Get Visibility into all Tiers of the Virtual Desktop," http://www.aternity.com/products/workforce-apm/virtual-desktop-monitoring/, May 11, 2014, 2 pages.
Solarwinds Worldwide. LLC., "SolarWinds: Virtualization Manager Administrator Guide," DocVersion 6.3.0.1, Sep. 8, 2015, 321 pages.
EG Innovations, Inc., "eG Enterprise Performance Monitoring for Citrix XenDesktop: Performance Assurance for Citrix Virtual Desktops," www.eginnovations.com, accessed on Sep. 17, 2015, 2 pages.
EG Innovations, Inc., "Service Overview: VDI Performance Assessment: Move VDI Deployments from Test to Best," www.eginnovations.com, accessed on Sep. 17, 2015, 2 pages.
EG Innovations, Inc., "Total Performance Monitoring for Citrix XenApp and XenDesktop," www.eginnovations.com, accessed on Sep. 17, 2015, 2 pages.
Goliath Technologies, "Goliath Performance Monitor: for Citrix XenApp & XenDesktop," http://goliathtechnologies.com, May 2014, 2 pages.
Goliath Technologies, "Goliath Performance Monitor: for VMware," http://goliathtechnologies.com, May 2014, 2 pages.
VMTURBO, "VDI Control Module," http://vmturbo.com, Nov. 2014, 2 pages.
VMTurbo, "VMTurbo Operations Manager: Demand-Driven Control for Cloud and Virtualization," http://vmturbo.com, Jun. 2015, 2 pages.
U.S. Appl. No. 14/562,474, Rustad et al.
U.S. Appl. No. 14/292,135, Rustad.
Quarles, John et al.; "A Mixed Reality Approach for Merging Abstract and Concrete Knowledge"; IEEE Virtual Reality 2008; Mar. 8-12, 2008; pp. 27-34.
U.S. Appl. No. 15/201,655, Qin et al.
U.S. Appl. No. 15/201,657, Qin et al.
Wood, Timothy, et al.; Middleware 2008; "Profiling and Modeling Resource Usage of Virtualized Applications"; vol. 5346 of the series Lecture Notes in Computer Science; Dec. 2008; pp. 366-387.

(56) References Cited

OTHER PUBLICATIONS

Liquidware Labs; "Performance Validation and Optimization"; http://www.liquidwarelabs.com/products/stratusphere-ux/performance-validation-optimization; Oct. 1, 2015; 2 pages.

Dell, Inc.; "Monitoring with User Dashboards"; vWorkspace Monitoring and Diagnostics 5.5.5—User's Guide; http://documents.software.dell.com/vworkspace-monitoring-and-diagnostics/5.6.5/users-guide/users-guide/working-with-foglight-for-virtual-desktops/monitoring-with-user-dashboards?ParentProduct=687; last revised on May 23, 2013; 4 pages.

Agrawal, Banit, et al.; "VMware View® Planner: Measuring True Virtual Desktop Experience at Scale"; VMWare Technical Journal (VMTJ), Winter 2012; Dec. 2012; pp. 69-79.

Spracklen, Lawrence, et al.; "Comprehensive User Experience Monitoring"; VMWare Technical Journal (VMTJ), Spring 2012; Mar. 2012; pp. 22-31.

\* cited by examiner

SYSTEM AND METHOD FOR END-TO-END RESPONSE-TIME ANALYSIS

BACKGROUND

Technical Field

The present disclosure relates generally to data analysis and more particularly, but not by way of limitation, to systems and methods for end-to-end response time analysis.

History of Related Art

Modern web applications process millions of transactions per day and can include multiple redundant layers. When problems occur, it can be difficult to trace the problem to a particular layer. Typical reports and alerts regarding transactions are complex and do not adequately indicate a root cause of poor-performing transactions.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method is performed by a computer system comprising physical computer hardware. The method includes selecting a group of transactions having a common end-to-end transaction path comprising a plurality of transaction-path nodes. Each transaction of the group is associated with either an acceptable category or an unacceptable category based, at least in part, on an end-to-end response time for the transaction. The method further includes separately determining, for each transaction-path node, an execution-time pair. The execution-time pair includes first aggregate information indicative of execution time by the transaction-path node for transactions associated with the acceptable category. The execution-time pair also includes second aggregate information indicative of execution time by the transaction-path node for transactions associated with the unacceptable category. Additionally, the method includes generating a visualization of the end-to-end transaction path. The visualization depicts each determined execution-time pair in relation to a corresponding transaction-path node.

In one embodiment, an information handling system includes a processing unit, wherein the processing unit is operable to implement a method. The method includes selecting a group of transactions having a common end-to-end transaction path comprising a plurality of transaction-path nodes. Each transaction of the group is associated with either an acceptable category or an unacceptable category based, at least in part, on an end-to-end response time for the transaction. The method further includes separately determining, for each transaction-path node, an execution-time pair. The execution-time pair includes first aggregate information indicative of execution time by the transaction-path node for transactions associated with the acceptable category. The execution-time pair also includes second aggregate information indicative of execution time by the transaction-path node for transactions associated with the unacceptable category. Additionally, the method includes generating a visualization of the end-to-end transaction path. The visualization depicts each determined execution-time pair in relation to a corresponding transaction-path node.

In one embodiment, a computer-program product includes a non-transitory computer-usable medium having computer-readable program code embodied therein. The computer-readable program code is adapted to be executed to implement a method. The method includes selecting a group of transactions having a common end-to-end transaction path comprising a plurality of transaction-path nodes. Each transaction of the group is associated with either an acceptable category or an unacceptable category based, at least in part, on an end-to-end response time for the transaction. The method further includes separately determining, for each transaction-path node, an execution-time pair. The execution-time pair includes first aggregate information indicative of execution time by the transaction-path node for transactions associated with the acceptable category. The execution-time pair also includes second aggregate information indicative of execution time by the transaction-path node for transactions associated with the unacceptable category. Additionally, the method includes generating a visualization of the end-to-end transaction path. The visualization depicts each determined execution-time pair in relation to a corresponding transaction-path node.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE

Embodiments of the Invention

Figure 1:
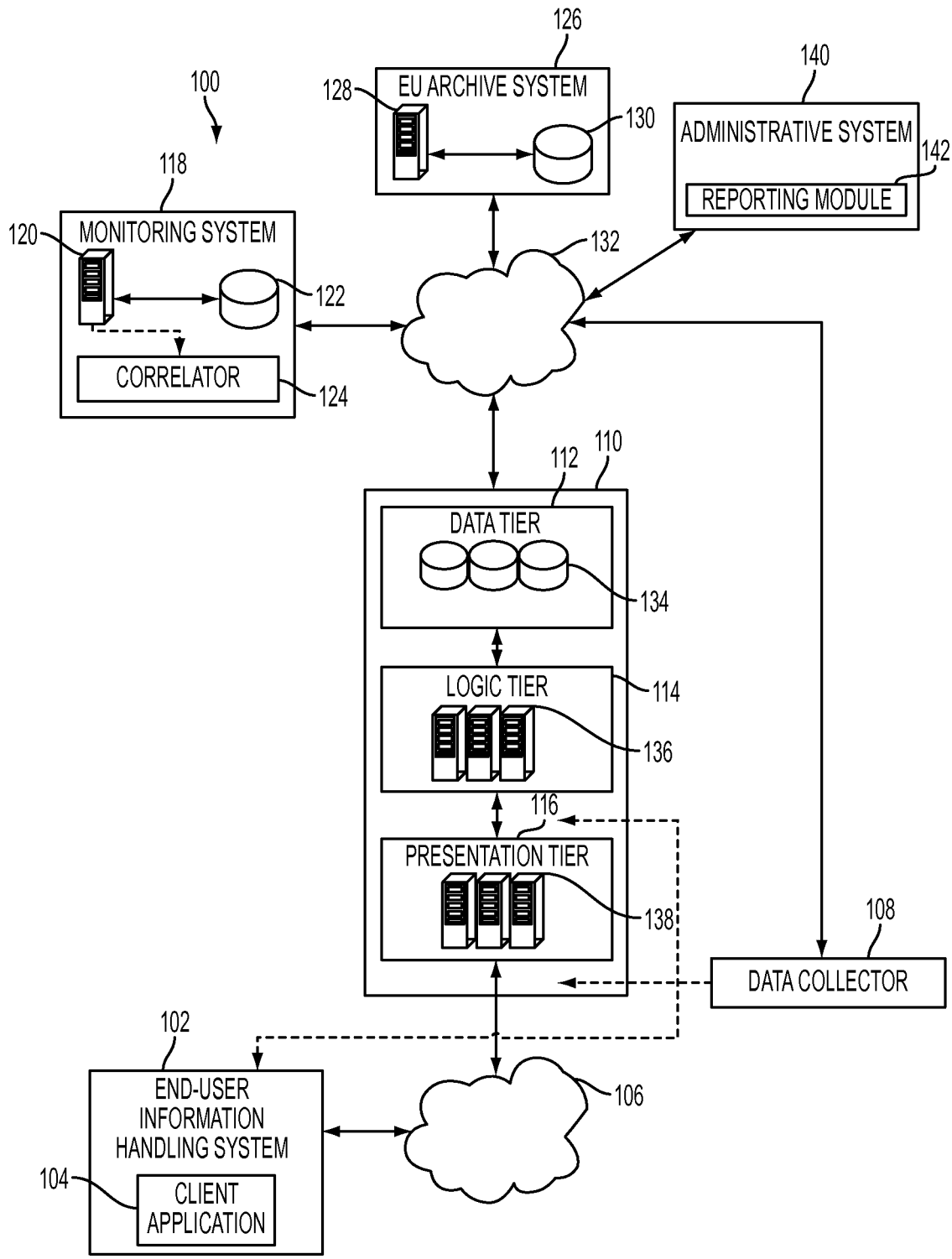
FIG. 1 illustrates a system for generating and performing analysis of end-to-end response times.

In various embodiments, a performance-monitoring system can track and trace end-user (EU) transactions. The performance-monitoring system can produce and store, for example, an end-to-end (E2E) response time for each EU transaction. An EU transaction, as used herein, is initiated by an EU request such as, for example, a web request, includes subsequent processing of the request by a backend-computing system, and is concluded by a web response from the backend-computing system. EU transactions can cross multiple nodes such as, for example, a web browser, a web server, an application server, a database, one or more external services, etc. An E2E response time can include, for example, a time elapsed from initiation through conclusion of an EU transaction.

One way to troubleshoot slow transaction performance is to aggregate E2E response times for a group of EU transactions and examine execution times at each node in an E2E transaction path. An E2E transaction path typically includes a set of nodes through which a given transaction passes. The E2E transaction path can be, for example, application-specific (e.g., web-application-specific). An E2E response time is typically made up of an execution time at each node in the E2E transaction path. For example, consider an exemplary E2E transaction path that includes a web browser, a network, a web server, an application server, and a database. Each E2E response time can be composed of execution times at each of the web browser, the network, the web server, the application server, and the database. For purposes of troubleshooting, execution times for a group of EU transactions can be aggregated, for example, by determining a mean, median, or mode, performing a statistical analysis, etc. From this information, it can be determined where transactions generally spend the most time. Manual root-cause analysis can subsequently occur.

A downside of the above-mentioned approach is that significant performance aberrations may become diluted in the aggregations. For example, it may be that each poor-performing transaction spends an excessively long period of time at the application server. However, until the poor-performing transactions become abundant in number, the aggregate execution times at the application server may not be indicative of a major problem and thus may not be useful in performing a root-cause analysis. In addition, it may not be immediately apparent what constitutes an excessively long execution time or to what degree a given execution time is excessive.

Various embodiments described herein facilitate a comparative performance analysis between acceptable EU transactions and unacceptable EU transactions. For example, in certain embodiments, each EU transaction can be associated with either an acceptable category or an unacceptable category based, at least in part, on whether an E2E response time exceeds a configurable threshold. The configurable threshold can be an absolute value (e.g., defined in seconds), a relative value (e.g., defined relative to a mean or median value for a transaction type), and/or the like. The configurable threshold can also be varied by type of transaction (e.g., log-in, checkout, etc.).

For purposes of aggregate analysis, an execution-time pair can be separately determined for each node along an E2E transaction path. The execution-time pair can include, for example, a first aggregate execution time for a group of EU transactions associated with the acceptable category and a second aggregate execution time for a group of EU transactions associated with the unacceptable category. Each aggregate execution time can represent a mean, median, mode, etc. Other methods of aggregation can also be used. Advantageously, in certain embodiments, this method enables simplified analysis of each node's performance in unacceptable transactions as compared with that same node's performance in acceptable transactions. In certain embodiments, when each node of the E2E transaction path is presented in this manner, it can more easily be determined which node or nodes are causes of the unacceptable transactions.

Backend performance data, as used herein, refers to data collected during runtime of a software application such as, for example, a web application, through instrumentation of the software application. EU-experience data, as used herein, refers to data collected through observation of one or more transactions from an EU perspective. For example, in various embodiments, the EU perspective may be a node between a web server and an EU information handling system, a node between a web server and an application server, or the EU information handling system.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

FIG. 1 illustrates a system 100 for generating and performing analysis of E2E response times. The system 100 includes at least one EU information handling system 102 communicating with a backend-computing system 110 over a network 106. The at least one EU information handling system 102 has a client application 104 such as, for example, a web-browser application, resident and executing thereon. The network 106 may include, for example, a public intranet, a private intranet, and/or the Internet. The system 100 further includes a monitoring system 118, an EU archive system 126, and an administrative system 140. The backend-computing system 110, the monitoring system 118, and the EU archive system 126 are operable to communicate over a network 132. Like the network 106, the network 132 may be representative, for example, of a public or private intranet or the Internet. In addition, the system 100 includes a data collector 108.

For illustrative purposes, the backend-computing system 110 is shown to utilize a three-tier architecture that includes a presentation tier 116, a logic tier 114, and a data tier 112. The presentation tier 116 includes at least one information server 138 such as, for example, a web server, that serves content to be rendered by the client application 104. The logic tier 114 includes at least one application server 136 that operates a platform based on, for example, Java EE, ASP-.NET, PHP, ColdFusion, Perl, and/or the like. The data tier 112 includes at least one database 134 that further includes, for example, data sets and a database management system that manages and provides access to the data sets.

It should be appreciated that, in various embodiments, the backend-computing system 110 may include any number of tiers. In addition, in various embodiments, the backend-computing system 110 may implement various alternative architectures such as, for example, a model-view-controller architecture. It should also be appreciated that the at least one application server 136 and the at least one information server 138 are shown separately in FIG. 1 only for purposes of illustrating logically-related functionality. In various embodiments, the at least one application server 136 and the at least one information server 138 are combined into a single server that functions as web server and application server.

The backend-computing system 110 executes one or more distributed software applications such as, for example, a web application, from which backend-performance data is collected. In a typical embodiment, the one or more distributed software applications have been instrumented to provide the backend-performance data. Each of the one or more distributed software applications may be, for example, a collection of software components or services that make up an application stack. In various embodiments, the backend-computing system 110 may use an agent resident thereon to collect the backend-performance data.

The backend-performance data can include, for example, metrics related to infrastructure components (virtual or physical) such as, for example, the at least one database 134, the at least one application server 136, and the at least information server 138. The backend-performance data can also include aggregated metrics related to infrastructure tiers such as, for example, the presentation tier 116, the logic tier 114, and the data tier 112. In addition, the backend-performance data can include metrics related to the application stack for each of the one or more distributed software applications. In a typical embodiment, the backend-performance data can trace EU transactions through a topology of nodes that can include, for example, infrastructure components, infrastructure tiers, and/or application-stack components as described above. Metrics can include, for example, execution time at each tier or by each component or node. Examples of how backend-performance data can collected and managed is described in detail in U.S. Pat. Nos. 7,979, 245 and 8,175,863, each of which is hereby incorporated by reference.

The data collector 108 is a software component that collects the EU-experience data for the at least one EU information handling system 102. In a typical embodiment, the data collector 108 is situated in the system 100 such that the data collector 108 is capable of seeing all network traffic (i.e., all packets exchanged) between the at least one EU information handling system 102 and the backend-computing system 110. In this fashion, the data collector 108 functions as a packet analyzer and is operable to extract the EU-experience data and transmit the EU-experience data to the EU archive system 126. The EU archive system 126 includes at least one server computer 128 and at least one database 130. The EU archive system 126 receives the EU-experience data from the data collector 108 and stores the EU-experience data in the at least one database 130. An example of how EU-experience data can be collected is described in U.S. Pat. No. 7,941,385. U.S. Pat. No. 7,941, 385 is hereby incorporated by reference.

As illustrated, the data collector 108 can reside at various nodes in the system 100. For example, the data collector 108 can reside on the backend-computing system 110 between the presentation tier 116 and the logic tier 114. The data collector 108 can also be resident on the backend-computing system 110 between the presentation tier 116 and the network 106. In addition, in various embodiments, the data collector 108 is representative of client-side scripting that is executed on the at least one EU information handling system 102. In this fashion, the data collector 108 can also be resident on the at least one EU information handling system 102. It should be appreciated that other locations for the data collector 108 such as, for example, within the presentation tier 116, are also contemplated.

The monitoring system 118 includes at least one server computer 120 and at least one database 122. The at least one server computer 120 is operable to execute a correlator 124. The correlator 124 is typically a software component that correlates the EU-experience data maintained by the EU archive system 126 with the backend-performance data maintained by the monitoring system 118 to yield E2E response times for EU transactions. Exemplary operation of the system 100 will be described with respect to FIG. 2.

The administrative system 140 includes a reporting module 142. The administrative system 140 can include any number of server computers and/or databases. The reporting module 142 can include hardware and/or software for generating and/or presenting alerts, reports, and/or the like based on data stored or generated by the monitoring system 118 and the EU archive system 126. The reports and/or alerts can be served to an administrative user using, for example, an information handling system similar to the EU information handling system 102. For example, in certain embodiments, the reporting module 142 can facilitate a comparative performance analysis between acceptable EU transactions and unacceptable EU transactions. An example of functionality of the reporting module 142 will be described with respect to FIG. 4.

One of ordinary skill in the art will appreciate that each instance of a computer or computer system as described above may be representative of any number of physical or virtual server computers. Likewise, each instance of a database may be representative of a plurality of databases. In addition, it should be appreciated that, in various embodiments, each instance of a network such as, for example, the network 106 or the network 132, can be viewed as an abstraction of multiple distinct networks. For example, the network 106 and the network 132 can each include one or multiple communications networks such as, for example, public or private intranets, a public switch telephone network (PSTN), a cellular network, the Internet, or the like. In addition, in various embodiments, the network 106 and the network 132 may overlap or refer to a same network.

Figure 2:
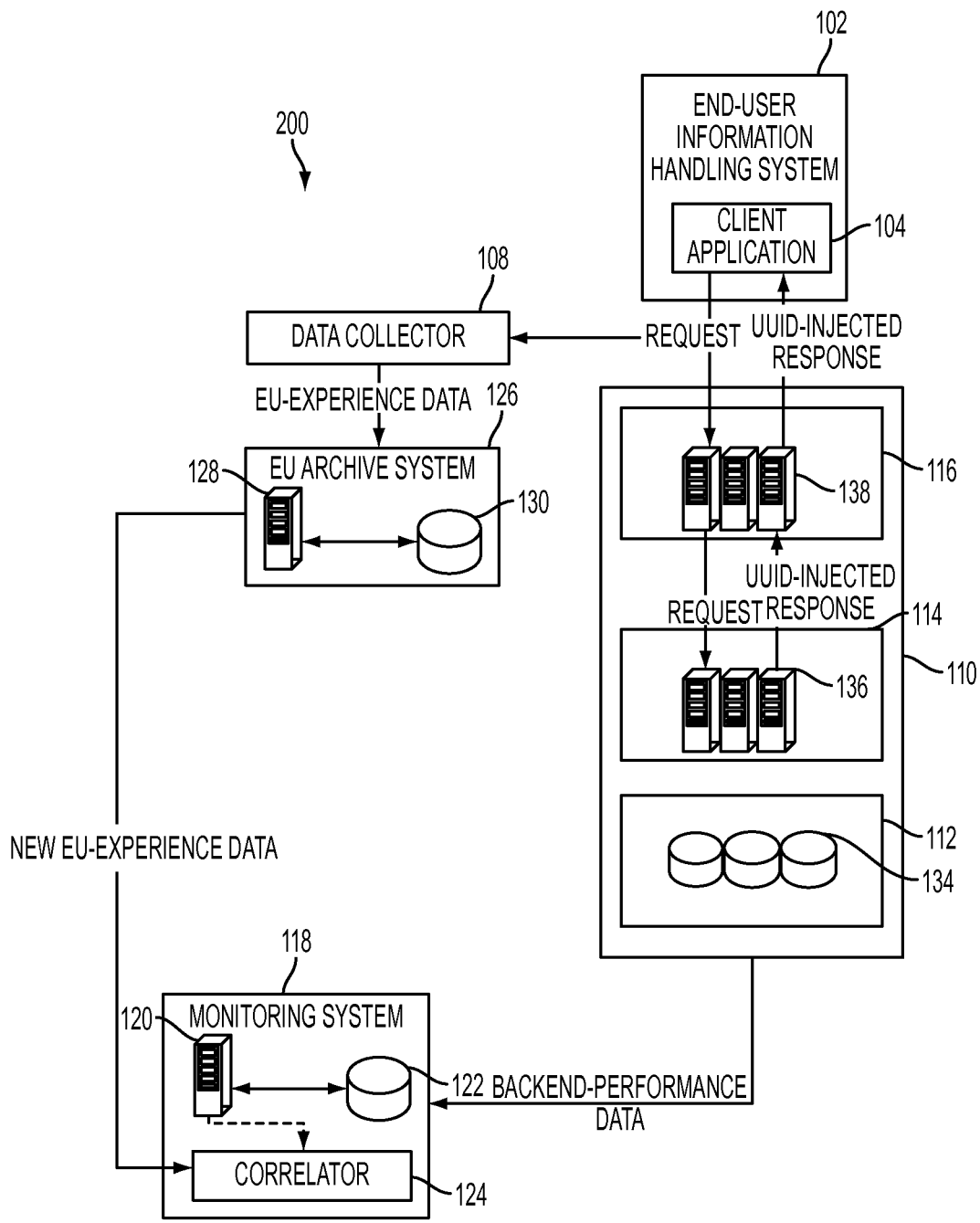
FIG. 2 illustrates an exemplary data flow using the system of FIG. 1.

FIG. 2 illustrates an exemplary data flow 200 using the system 100 of FIG. 1. The EU information handling system 102 initiates a transaction by directing a request such as, for example, an HTTP request, to the at least one information server 138 of the presentation tier 116. The at least information server 138 forwards the request to an appropriate application server, i.e., the at least one application server 136, for handling. The at least one application server 136 generates an identifier (e.g., a UUID) for the transaction. In a typical embodiment, the backend-computing system 110 uses the identifier to identify backend-performance data collected during processing of the transaction, which data is stored by the monitoring system 118 as described above.

A monitoring agent on the at least one application server 136 injects the identifier in a response to the request (i.e., a UUID-injected response), which response is directed to the at least one EU information handling system 102 along a transmission path that includes that at least one information server 138 and the at least one EU information handling system 102. In this fashion, no modification of application code is required to inject the identifier. Rather, the monitoring agent, which is already being utilized for existing instrumentation of the distributed software application, injects the identifier into the response. The response may be a web response such as, for example, an HTTP response. In various embodiments, the identifier can be injected, for example, into a response header for the response. In some embodiments, the identifier may be inserted into a cookie that is sent as part of the response header. Content of the UUID-injected response is rendered on the at least one EU information handling system 102 via the client application 104.

As noted above, the data collector 108 is situated on the system 100 so that the data collector 108 can observe all network traffic exchanged between the backend-computing system 110 and the EU information handling system 102. Therefore, the data collector 108 is effectively a transparent node along the transmission path. The data collector 108 passively observes the UUID-injected response and uses the identifier to identify EU-experience data that is collected.

The correlator 124 is operable to extract EU-experience data not previously obtained by the correlator (i.e., new EU-experience data) from the EU archive system 126. In various embodiments, the correlator 124 may operate on a periodic basis, on-demand, or in real-time. The correlator 124 is operable to correlate the EU-experience data and the backend-performance data that relates to a same transaction (i.e., a same request and response) by cross-referencing identifiers. In this manner, data resulting from instrumentation (the backend-performance data) and the EU-experience data, which is typically collected without instrumentation, can be correlated. The correlated data can be stored in the at least one database 122. The correlated data can also be used to generate E2E response times for end-use transactions. In addition, on a periodic basis (e.g., every five minutes) or on demand, the correlator 124 may aggregate the correlated data into one or more high-level transaction categories such as, for example, log-in, search, or checkout. Therefore, problems with particular transaction categories can be readily identified and appropriate alerts generated.

Figure 3:
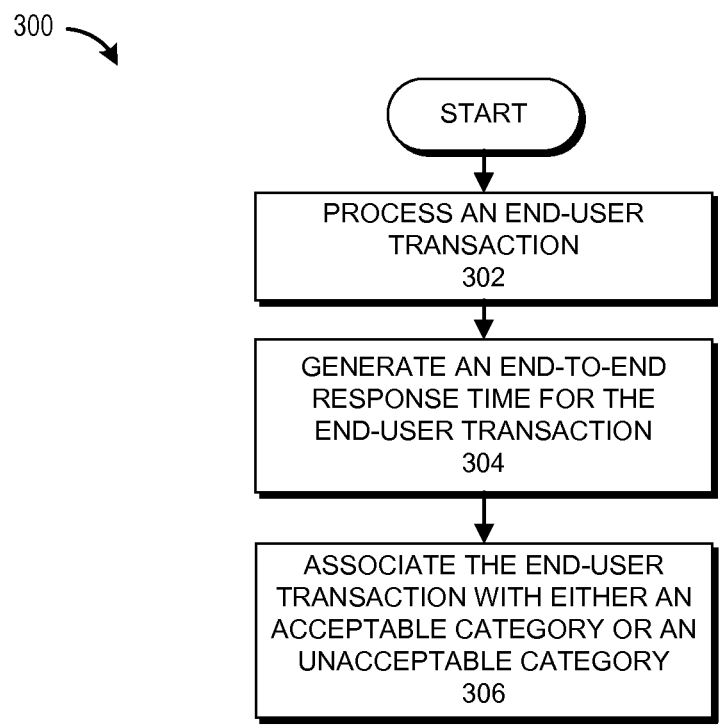
FIG. 3 illustrates an example of a process for determining an acceptability categorization of an end-user transaction.

FIG. 3 illustrates an example of a process 300 for determining an acceptability categorization of an EU transaction. In various embodiments, the process 300 can be performed for each EU transaction handled by a backend-computing system such as the backend-computing system 110. For example, the process 300, in whole or in part, can be implemented by one or more of the monitoring system 118, the correlator 124, the EU archive system 126, the administrative system 140, the reporting module 142, and/or the EU information handling system 102. The process 300 can also be performed generally by the system 100. Although any number of systems, in whole or in part, can implement the process 300, to simplify discussion, the process 300 will be described in relation to specific systems or subsystems of the system 100.

At block 302, the system 100 processes an EU transaction. For example, the block 302 can include tracing the EU transaction as described with respect to FIGS. 1 and 2. At block 304, the monitoring system 118, or another component, generates an E2E response time for the EU transaction. For example, the E2E response time can be based on correlated data as described with respect to FIGS. 1-2. The E2E response time can also be based on backend-performance data and EU-experience data that is correlated in other ways such as, for example, session identifiers, session timing, and/or other information.

At block 306, the monitoring system 118, the reporting module 142, or another component, associates the EU transaction with either an acceptable category or an unacceptable category. For example, in certain embodiments, the EU transaction can be associated with the unacceptable category if the E2E response time exceeds a configurable threshold value. Otherwise, the EU transaction can be associated with the acceptable category. The configurable threshold can be an absolute value (e.g., defined in seconds), a relative value (e.g., defined relative to a mean or median value for a transaction type), and/or the like. The configurable threshold can also be varied by type of transaction (e.g., log-in, checkout, etc.). The association can also be stored, for example, in the at least one database 122, a database on the administrative system 140, in memory of the monitoring system 118 and/or the administrative system 140, etc.

Figure 4:
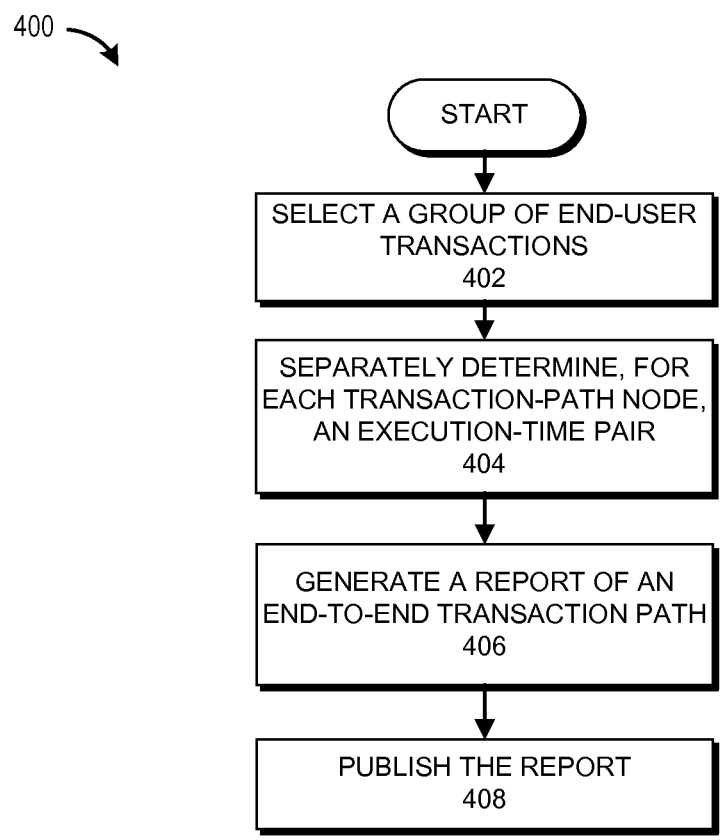
FIG. 4 illustrates an example of a process for comparing end-to-end response-time breakdowns between acceptable and unacceptable transactions.

FIG. 4 illustrates an example of a process 400 for comparing E2E response-time breakdowns between acceptable and unacceptable transactions. For example, the process 400, in whole or in part, can be implemented by one or more of the monitoring system 118, the correlator 124, the EU archive system 126, the administrative system 140, the reporting module 142, and/or the EU information handling system 102. The process 400 can also be performed generally by the system 100. Although any number of systems, in whole or in part, can implement the process 400, to simplify discussion, the process 400 will be described in relation to specific systems or subsystems of the system 100.

At block 402, the reporting module 142 selects a group of EU transactions that have a common E2E transaction path. For example, the group of transactions can relate to a same application or web application. The E2E transaction path includes a plurality of transaction-path nodes such as, for example, a web browser, a network, a web server, an application server, a database, an external service, and/or the like. Each transaction of the group may be of a same type or a different type. For example, in some embodiments, the selected group may be all checkout transactions over a certain period of time. By way of further example, the selected group can include a heterogeneous set of transaction types such as, for example, log-in, search, and checkout. In certain embodiments, the group of EU transactions can be transactions for which a process similar to the process 300 of FIG. 3 has been executed. In some embodiments, the selection can be automated. In other embodiments, the selection can be responsive to user input, for example, from an administrative user of an information handling system such as the EU information handling system 102.

At block 404, the reporting module 142 separately determines an execution-time pair for each transaction-path node of the E2E transaction path. In general, the execution-time pair includes two aggregate representations. A first aggregate representation can be indicative of execution time by the transaction-path node of those transactions of the group that are deemed unacceptable transactions. A second aggregate representation can be indicative of execution time by the transaction-path node of those transactions of the group that are deemed acceptable transactions. An example of functionality that can be performed at the block 404 will be described in greater detail with respect to FIG. 5.

At block 406, the reporting module 142 generates a report of the E2E transaction path. The report can be considered a breakdown, across the plurality of transaction-path nodes, of an aggregate E2E response time for the group. In general, the report indicates, or summarizes, each determined execution-time pair in relation to a corresponding transaction-path node. In certain embodiments, the report can be a visualization of the E2E transaction path. In these embodiments, the visualization may depict each determined execution-time pair in relation to the corresponding transaction-path node. In certain other embodiments, the report can be a collection of data representative of each determined execution-time pair and its corresponding transaction-path node.

At block 408, the reporting module 142 publishes the report. For example, the report can be transmitted to a system, entity, or user. In embodiments in which the report is a visualization, the block 408 can include causing the visualization to be displayed, for example, to an administrative of user of an EU information handling system such as the EU information handling system 102 of FIG. 1. In some embodiments, publishing the report can include transmitting the report to another system for analysis. For example, in some cases, the report can be used to make automatic scaling decisions in a shared-resource environment such as, for example, a cloud environment.

Figure 5:
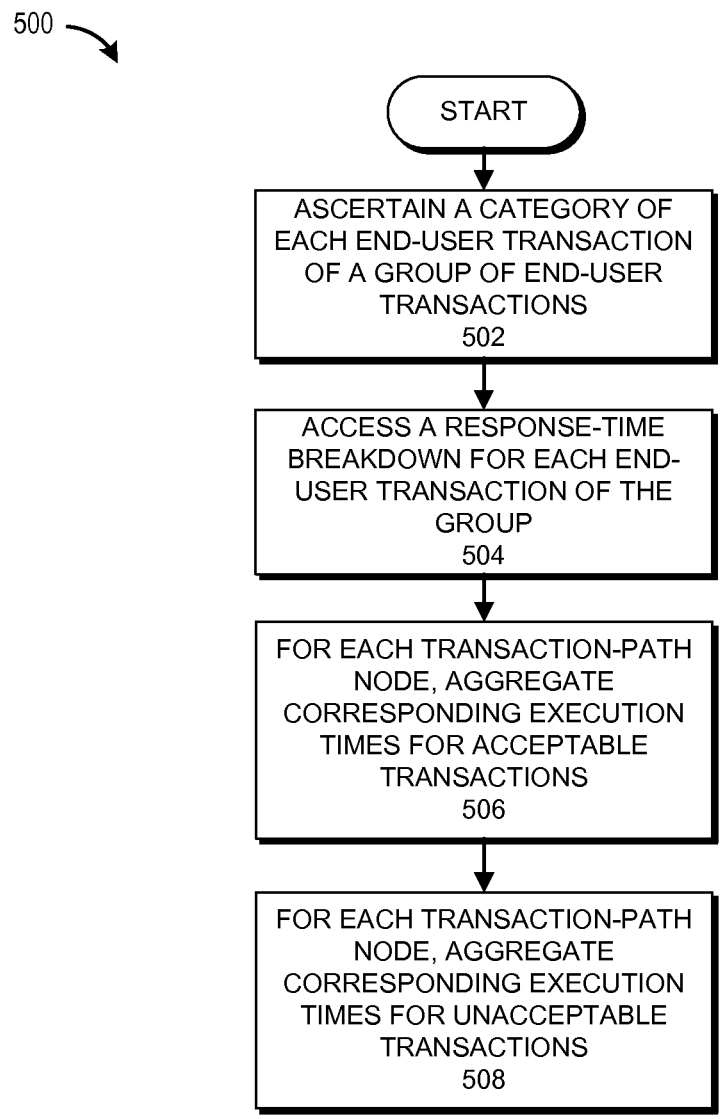
FIG. 5 illustrates an example of a process for separately determining an execution-time pair for each transaction-path node of a transaction path.

FIG. 5 illustrates an example of a process 500 for separately determining an execution-time pair for each transaction-path node of a transaction path. In various embodiments, the process 500 can be performed as all or part of the block 404 of FIG. 4. For example, the process 500, in whole or in part, can be implemented by one or more of the monitoring system 118, the correlator 124, the EU archive system 126, the administrative system 140, the reporting module 142, and/or the EU information handling system 102. The process 500 can also be performed generally by the system 100. Although any number of systems, in whole or in part, can implement the process 500, to simplify discussion, the process 500 will be described in relation to specific systems or subsystems of the system 100.

At block 502, the reporting module 142 ascertains a category of each EU transaction of a group of EU transactions. The group can be, for example, a group that is selected as described with respect to the block 402 of FIG. 4. In certain embodiments, the category can be one of two categories: an acceptable category and an unacceptable category. Each category can be ascertained, for example, by accessing the at least one database 122 or other memory.

At block 504, the reporting module 142 accesses a response-time breakdown for each EU transaction of the group. Each response-time breakdown typically includes an execution time for each transaction-path node of the transaction path. At block 506, for each transaction-path node, the reporting module 142 aggregates corresponding execution times for those EU transactions of the group that are associated with the acceptable category. The aggregation can include computing a mean, median, or mode, performing a statistical analysis, or aggregating in another suitable fashion. At block 508, for each transaction-path node, the reporting module 142 aggregates corresponding execution times for those EU transactions of the group that are associated with the unacceptable category. The aggregation at the block 506 can be performed in similar fashion to the aggregation at the block 504.

Figure 6:
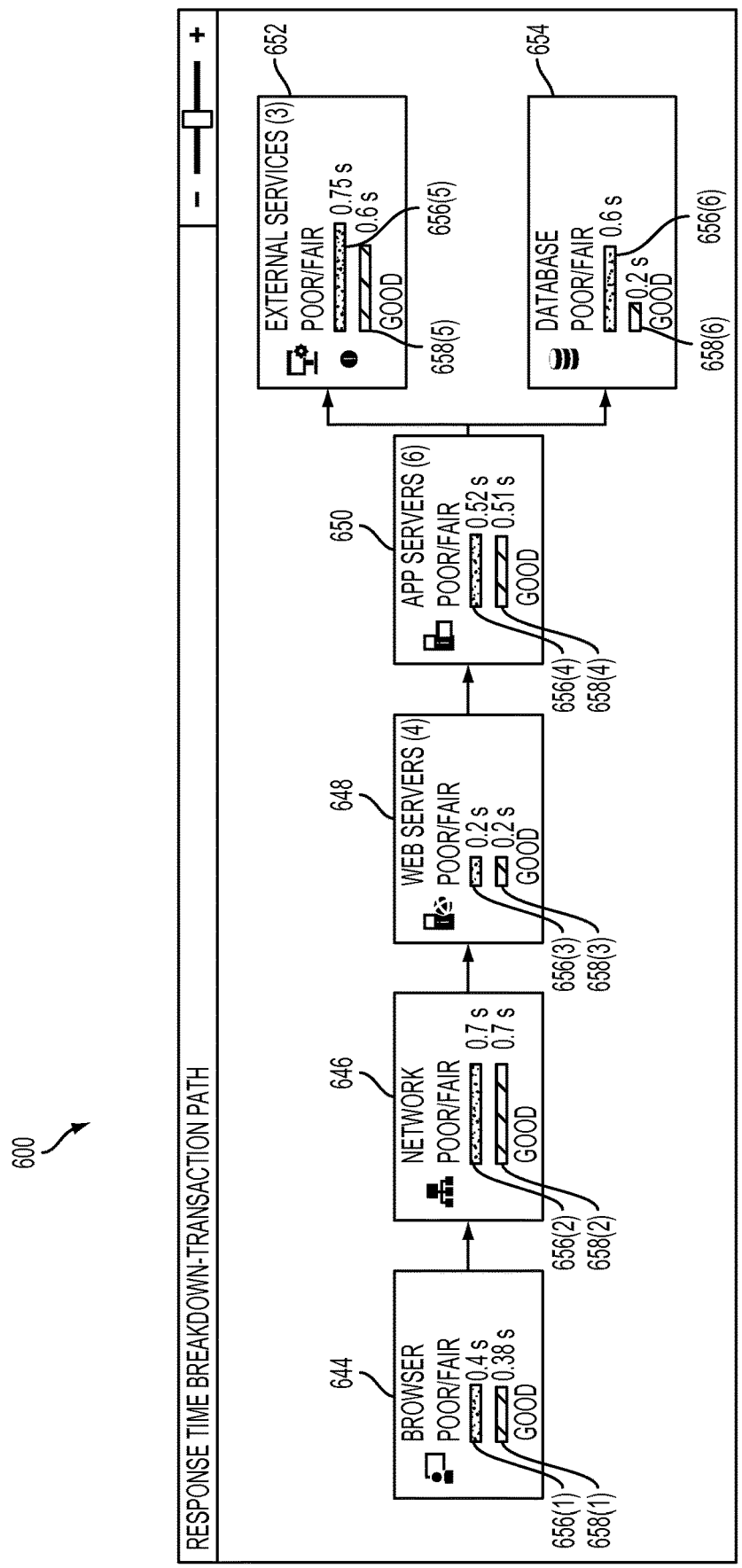
FIG. 6 illustrates an example of a visualization.

FIG. 6 illustrates an example of a visualization 600. In various embodiments, the visualization 600 can be generated as described with respect to the block 406 of FIG. 4 and/or caused to be displayed as described with respect to the block 408 of FIG. 4. As illustrated, the visualization 600 shows a response-time breakdown across a transaction path that includes a browser 144, a network 646, one or more web servers 648, one or more application servers 650, one or more external services 652, and one or more databases 654.

More particularly, the visualization 600 illustrates unacceptable-category aggregate representations 656(1)-656(6) (collectively, unacceptable-category aggregation representations 656) and acceptable-category aggregate representations 658(1)-658(6) (collectively, acceptable-category aggregation representations 658) as described with respect to the block 404 of FIG. 4. The unacceptable-category aggregate representation 656(1) and the acceptable-category aggregate representation 658(1) may be considered an execution-time-pair as described above for the browser 644. As illustrated, each of the network 646, the one or more web servers 648, the one or more application servers 650, the one or more external services 652, and the one or more databases 654 similarly have execution-time pairs.

In a typical embodiment, as depicted in FIG. 6, a visualization of each execution-time pair can be scaled to a highest value contained therein. For example, with respect to the browser 144, a value for the unacceptable-category aggregation representation 656(1) is higher than a value for the acceptable-category aggregate representation 658(1). Therefore, a length of a horizontal bar corresponding to the acceptable-category aggregate representation 658(1) is scaled in proportion to a length of a horizontal bar corresponding to the unacceptable-category aggregate representation 656(1).

In various embodiments, the visualization 600 can facilitate improved root-cause analysis. In the illustrated embodiment, the one or more databases 654 is indicated to have a significant difference in response time between the unacceptable-category aggregation representation 656(6) and the acceptable-category aggregate representation 658(6). In contrast, the browser 144, the network 646, the one or more web servers 648, the one or more application servers 650, and the one or more external services 652 exhibit far less variation in performance between unacceptable transactions and acceptable transactions. For purposes of this example, the one or more databases 654 may be considered a potential root cause of the unacceptable transactions.

It should be appreciated that end-user transactions are described herein only for illustrative purposes. In certain embodiments, various principles described above relative to FIGS. 1-6 can similarly be applied to numerous other types of timed, multi-node transactions. Another example of a timed, multi-node transaction can be database query execution (e.g., execution of SQL queries, NoSQL queries, etc.). In the case of a database query, certain sources of delay in database-query execution can be considered nodes of a transaction path. Execution time of a database query, or of a group of database queries could be affected by CPU time, input/output operations, lock delay, latch delay, and/or the like. In an example, a given transaction path could include a node for each of CPU time, input/output operations, lock delay, latch delay, and/or the like. According to this example, overall execution time can correspond to an end-to-end response time as described above. In certain embodiments, a report as described with respect to FIG. 4 can be generated for a group of database-query executions. The report can be generated as described with respect to the block 406 of FIG. 4 and/or published as described with respect to the block 408 of FIG. 4. The group of database-query executions can relate, for example, to a particular database query, a selection of a plurality of database queries, a selection of database queries involving one or more databases, etc. The report can be, for example, a visualization similar to the visualization 600 of FIG. 6.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising, by a computer system comprising physical computer hardware:
   selecting a group of transactions having a common end-to-end transaction path comprising a plurality of transaction-path nodes;
   wherein each transaction of the group is associated with either an acceptable category or an unacceptable category based, at least in part, on an end-to-end response time for the transaction;
   separately determining, for each transaction-path node of the plurality of transaction-path nodes, an execution-time pair, the execution-time pair comprising:
      first aggregate information indicative of aggregate execution time by the transaction-path node for the transactions of the group that are associated with the acceptable category; and
      second aggregate information indicative of aggregate execution time by the transaction-path node for the transactions of the group that are associated with the unacceptable category;
   generating a report of the end-to-end transaction path,
   wherein the report indicates each determined execution-time pair in relation to a corresponding transaction-path node; and
   causing the end-to-end transaction path to be displayed, wherein the causing comprises scaling a visualization of at least one determined execution-time pair to a greater of:
      an aggregate execution-time value corresponding to transactions associated with the acceptable category; and
      an aggregate execution-time value corresponding to transactions associated with the unacceptable category.

2. The method of claim 1, wherein:
   the report comprises a visualization of the end-to-end transaction path; and
   wherein the visualization depicts each determined execution-time pair in relation to a corresponding transaction-path node.

3. The method of claim 1, wherein the plurality of transaction-path nodes comprise a plurality of tiers.

4. The method of claim 1, comprising, prior to the selecting, for each transaction of a plurality of transactions, associating the transaction with either the acceptable category or the unacceptable category.

5. The method of claim 1, wherein the separately determining comprises:
   ascertaining a category of each transaction of the group;
   accessing a response-time breakdown for each transaction of the group;
   for each transaction-path node, aggregating corresponding execution times for the transactions associated with the acceptable category; and
   for each transaction-path node, aggregating corresponding execution times for the transactions associated with the unacceptable category.

6. The method of claim 1, wherein the group comprises end-user transactions.

7. The method of claim 6, wherein the plurality of transaction-path nodes comprise an end-user client application, a network, at least one web server, at least one application server, at least one database, and at least one external service.

8. The method of claim 1, wherein:
   the group comprises a plurality of database-query executions; and
   the plurality of transaction-path nodes comprise a plurality of sources of delay in the plurality of database-query executions.

9. An information handling system comprising:
   a hardware computer processor, wherein the hardware computer processor is operable to implement a method, the method comprising:
      selecting a group of transactions having a common end-to-end transaction path comprising a plurality of transaction-path nodes;
      wherein each transaction of the group is associated with either an acceptable category or an unacceptable category based, at least in part, on an end-to-end response time for the transaction;
      separately determining, for each transaction-path node of the plurality of transaction-path nodes, an execution-time pair, the execution-time pair comprising:
         first aggregate information indicative of aggregate execution time by the transaction-path node for the transactions of the group that are associated with the acceptable category; and
         second aggregate information indicative of execution time by the transaction-path node for the transactions of the group that are associated with the unacceptable category;
      generating a report of the end-to-end transaction path,
      wherein the report indicates each determined execution-time pair in relation to a corresponding transaction-path node; and
   causing the end-to-end transaction path to be displayed, wherein the causing comprises scaling a visualization of at least one determined execution-time pair to a greater of:
      an aggregate execution-time value corresponding to transactions associated with the acceptable cateogry; and
      an aggregate execution-time value corresponding to transactions associated with the unacceptable category.

10. The information handling system of claim 9, wherein:
    the report comprises a visualization of the end-to-end transaction path; and
    wherein the visualization depicts each determined execution-time pair in relation to a corresponding transaction-path node.

11. The information handling system of claim 9, the method comprising, prior to the selecting, for each transaction of a plurality of transactions, associating the transaction with either the acceptable category or the unacceptable category.

12. The information handling system of claim 9, wherein the separately determining comprises:
    ascertaining a category of each transaction of the group;
    accessing a response-time breakdown for each transaction of the group;

for each transaction-path node, aggregating corresponding execution times for the transactions associated with the acceptable category; and for each transaction-path node, aggregating corresponding execution times for the transactions associated with the unacceptable category.

13. The information handling system of claim 9, wherein the group comprises end-user transactions.

14. The information handling system of claim 13, wherein the plurality of transaction-path nodes comprise an end-user client application, a network, at least one web server, at least one application server, at least one database, and at least one external service.

15. The information handling system of claim 9, wherein:
   the group comprises a plurality of database-query executions; and
   the plurality of transaction-path nodes comprise a plurality of sources of delay in the plurality of database-query executions.

16. A computer-program product comprising a non-transitory computer-usable medium having computer-readable program code embodied therein, the computer-readable program code adapted to be executed to implement a method comprising:
   selecting a group of transactions having a common end-to-end transaction path comprising a plurality of transaction-path nodes;
   wherein each transaction of the group is associated with either an acceptable category or an unacceptable category based, at least in part, on an end-to-end response time for the transaction;
   separately determining, for each transaction-path node of the plurality of transaction-path nodes, an execution-time pair, the execution-time pair comprising:
      first aggregate information indicative of aggregate execution time by the transaction-path node for the transactions of the group that are associated with the acceptable category; and
      second aggregate information indicative of aggregate execution time by the transaction-path node for the transactions of the group that are associated with the unacceptable category;
   generating a report of the end-to-end transaction path, wherein the report indicates each determined execution-time pair in relation to a corresponding transaction-path node; and
   causing the end-to-end transaction to be displayed, wherein the causing comprises scaling a visualization of at least one determined execution-time pair to a greater of:
      an aggregate execution-time value corresponding to transactions associated with the acceptable category; and
      an aggregate execution-time value corresponding to transactions associated with the unacceptable category.

* * * * *

UNITED STATES PATENT AND TRADEMARK OFFICE
CERTIFICATE OF CORRECTION

| | |
|---|---|
| PATENT NO. | : 11,005,738 B1 |
| APPLICATION NO. | : 14/249147 |
| DATED | : May 11, 2021 |
| INVENTOR(S) | : Joseph Rustad et al. |

Page 1 of 1

It is certified that error appears in the above-identified patent and that said Letters Patent is hereby corrected as shown below:

In the Claims

Column 12, Claim 9, Line 47    Replace "associated with the acceptable cateogry" with -- associated with the acceptable category --

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*